United States Patent [19]

Burger et al.

[11] 4,140,365
[45] Feb. 20, 1979

[54] FIBER OPTIC CABLE CONNECTOR HOUSING

[75] Inventors: Hans Burger; Herbert Haag; Manfred Illg, all of Weinstadt, Fed. Rep. of Germany

[73] Assignee: ITT Industries, Inc., New York, N.Y.

[21] Appl. No.: 787,612

[22] Filed: Apr. 14, 1977

[30] Foreign Application Priority Data

Apr. 24, 1976 [DE] Fed. Rep. of Germany ... 7612933[U]

[51] Int. Cl.² .................................................. G02B 5/14
[52] U.S. Cl. ................................. 350/96.20; 350/96.22
[58] Field of Search ............... 350/96.20, 96.21, 96.22; 339/205, 128

[56] References Cited

U.S. PATENT DOCUMENTS

| | | | |
|---|---|---|---|
| 3,504,984 | 4/1970 | Bush | 350/96.22 |
| 3,573,716 | 4/1971 | Garver | 339/128 |
| 3,806,225 | 4/1974 | Codrino | 350/96.20 |
| 3,914,880 | 10/1975 | Dakss et al. | 350/96.21 |
| 4,046,453 | 9/1977 | Fieblekorn | 350/96.21 |

*Primary Examiner*—John K. Corbin
*Assistant Examiner*—Rolf Hille
*Attorney, Agent, or Firm*—Thomas L. Peterson

[57] ABSTRACT

A connector housing for a pair of fiber optic cables each terminated by a sleeve. The housing is provided with integral resilient latching fingers adjacent to its opposite ends which engage behind shoulders on the sleeves to releasably retain the sleeves in the housing.

1 Claim, 2 Drawing Figures

FIBER OPTIC CABLE CONNECTOR HOUSING

BACKGROUND OF THE INVENTION

The present invention relates to a connector housing for accommodating two fiber optic cables capable of being connected to one another.

Fiber optic cables are used as transmission media in fiber optical communications systems, owing to their favorable properties. Often, longer transmission links are composed of several fiber optic cables of shorter lengths, with the ends thereof being provided with connecting elements capable of being coupled to one another inside connector housings. In order to keep the coupling losses at a low as possible level, the fiber-mating regions of the butted-up fiber optic cable ends must be aligned precisely to one common optical axis.

One such connector arrangement which, moreover, permits a precise alignment of the optical fibers, is described in German Pat. No. 2,159,327. The connector, however, is of relatively complicated design and expensive in its manufacture. In addition, the high aligning accuracy achievable with this connector is very often not required in practice.

It is the object of the present invention to provide for fiber optic cables, a connector housing of simple design and, therefore, inexpensive in manufacture which, however, enables the alignment of two fiber optic cable ends to one common optical axis and, in addition, permits a rapid establishment of connections as well as a rapid uncoupling of the fiber optic cables.

SUMMARY OF THE INVENTION

According to the principal aspect of the present invention, there is provided a connector housing comprising an elongated body having a receiving bore axially passing therethrough. The connector sleeves for the fiber optic cables to be coupled are formed with rearwardly facing shoulders. A resilient latching finger is formed on the wall of the body adjacent to its opposite ends. When the connector sleeves are inserted into the opposite ends of the receiving bore, the fingers latch behind the shoulders on the sleeves, thereby releasably retaining the sleeves in the housing.

Thus, for establishing the connection between the ends of two fiber optic cables, there is required in an advantageous manner, only one connector housing whose receiving bore simultaneously effects the alignment of the fiber optic cable ends. When inserting the cable ends provided with the connector sleeves into the connector housing, the latching fingers thereof are automatically pushed aside and, subsequent to the complete insertion of the cable ends, serve to automatically retain the latter in position. Accordingly, it is possible to establish the connection in an extremely simple way. Also, disengagement of the connection causes no difficulties, because to this end it is merely required to deflect the latching fingers outwardly beyond the shoulders on the sleeves. For this purpose, there is not required any special tool but merely, for example, a screw driver, with the pointed end of which the respective free end of the latching fingers is lifted. If no such tool is available, this may even be done with the aid of a finger nail.

DESCRIPTION OF THE PREFERRED EMBODIMENTS

Figure 1:
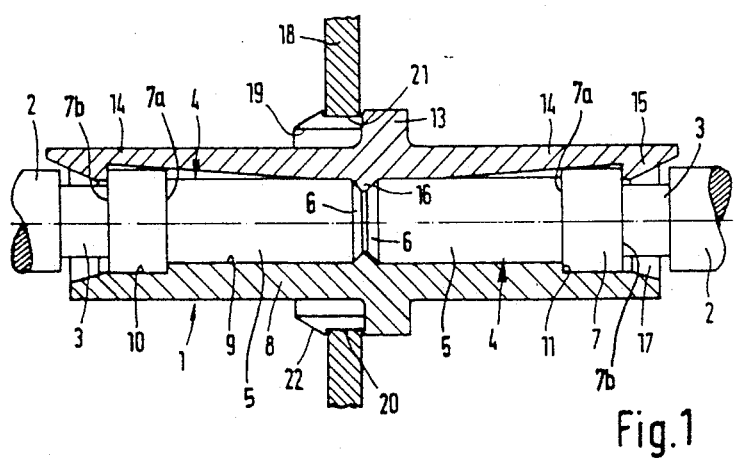
FIG. 1 is a longitudinal section showing the connector housing of the invention mounted to a circuit board, with connecting sleeves of two fiber optic cables mounted therein.
Figure 2:
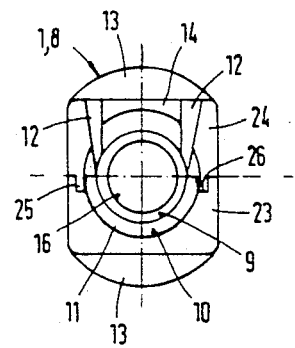
FIG. 2 is an end view of the connector housing with the connecting sleeves removed, looking in the direction of the right side of FIG. 1.

In FIGS. 1 and 2, the connector housing is generally indicated by the reference numeral 1. The housing serves to establish the connection between two fiber optic cables 2 whose lightwave-conducting ends 3 are each mounted inside a connector sleeve 4. The connector sleeve 4 consists of a cylindrical front part 5 whose end face is provided with a circular bevel 6. On the cable inlet side, the connector sleeve 4 is formed with a radially outwardly extending end ring or collar 7, providing a forward facing annular shoulder 7a and a rearwardly facing annular shoulder 7b.

The connector housing 1 consists of an elongated body 8 preferably having a square cross-section. Preferably, the body 8 is formed of plastic or other insulating material. The body 8 is traversed in its axial direction by a cylindrical receiving bore 9 whose internal diameter corresponds to the external diameter of the front part 5 of the connector sleeve 4 of each fiber optic cable 2. The receiving bore 9 is enlarged adjacent to the ends of the body 8, providing a pair of outwardly facing stop shoulders 11 restricting the insertion depth of the connector sleeves 4 into the bore 9.

As seen in FIG. 2, the wall of the body 8 embodies a double arrangement of two slots 12 extending at a parallel spaced relation from one another. These slots extend from each end of body 8 in the axial direction to a flange 13 which is outwardly directed and arranged almost in the center of the body. The wall members of the body between the slots 12 form integral, resilient latching fingers 14. Each finger is provided with an inwardly directed snap lock 15 adjacent to its free end.

When inserting a fiber optic cable 2 into the receiving bore 9 of the connector housing 1, the snap lock 15 is first pushed aside by the end ring 7 of the connector sleeve 4, thus causing the latching finger 14 to be deflected outwardly. As soon as the end ring 7 meets against the stop shoulder 11 of the body 8, the latching finger 14 resiliently returns to its original position, with the snap lock 15 engaging behind the shoulders 7b, thus retaining the connector sleeve 4 in place.

When the connector sleeve 4 has assumed its locked position inside the connector housing 1, the bevelled end face engages a rib 16 of the body 8 slightly reducing the diameter of the receiving bore 9, and serving to divide the receiving bore 9 into two equally long halves. Since this rib 16 likewise acts like a limit stop respecting the insertion depth of the connector sleeves 4, both the enlargement 10 and the end ring 7 may also be omitted. In this case, for latching the connector sleeve 4 in place, the snap lock 15 will then directly grip behind the rear end of the sleeve.

In order to facilitate the insertion of the connector sleeves 4, the opposite ends of the bore 9 are each provided with a funnel-shaped inlet 17. In order to easily release the latching of the connector sleeves 4, the latching fingers 14, as shown in FIG. 1, may be designed to be somewhat longer than the remaining part of the body 8. Accordingly, unlatching of the connector parts is capable of being carried out in the most simple way by lifting the snap locks 15.

For securing the connector housing 1, for example, to a mounting (circuit) board 18, the body 8 is provided on one side of the flange 13 with a collar 19. The collar embodies a pair of longitudinally extending slots on opposite sides thereof. The collar is also formed with an annular groove 20 extending radially on its outside. Both the flange 13 and the collar 19 form a snapaction type of retaining device which becomes effective by pressing the connector housing 1 into an opening 21 in the mounting (circuit) board 18. In order to perform this easily without any tools, the collar 19 is provided at its free end with an inclined surface 22.

The connector housing 1 may consist of a one-piece injection molded body of plastic. Preferably, however, two separate half shells are manufactured, so that the body 8 consists of a lower part 23 and a top part 24. Projections 24 or guide strips 25 are formed on the bottom side of the top part 24 for engaging into corresponding grooves 26 in the bottom part 23 to hold the parts together. Actually, it is sufficient for the two halves to be loosely joined together, but they may also be attached to one another by press fit, or by means of gluing or welding.

In order to be able to arrange several connector housings 1 closely next to each other, flanges 13 are provided, for example, only on two opposite longitudinal sides of the body 8, while the other two longitudinal sides have plane surfaces.

What is claimed is:

1. A connector housing for accommodating two fiber optic cables each terminated by a connector sleeve provided with forwardly and rearwardly facing shoulders comprising:

an elongated body having a receiving bore axially passing therethrough;

means providing a pair of outwardly facing stop shoulders in said bore;

a resilient latching finger formed in the wall of said body adjacent to the opposite ends thereof;

each said latching finger being formed by two slots arranged parallel to each other in the wall of said body extending inwardly from a respective end of said body;

said latching fingers having at their free ends inwardly directed shoulders adapted to engage the rearwardly facing shoulders on the connector sleeves intended to be inserted into said receiving bore for retaining the sleeves in said bore; and each said latching finger embodying an outwardly flared surface behind said inwardly directed shoulder adapted to be engaged by the forwardly facing shoulder of the connector sleeve upon insertion of the sleeve into said receiving bore causing said latching finger to automatically deflect outwardly.

* * * * *